June 23, 1936.     I. POVELSEN     2,044,808
MECHANICAL CALENDAR
Filed March 8, 1934
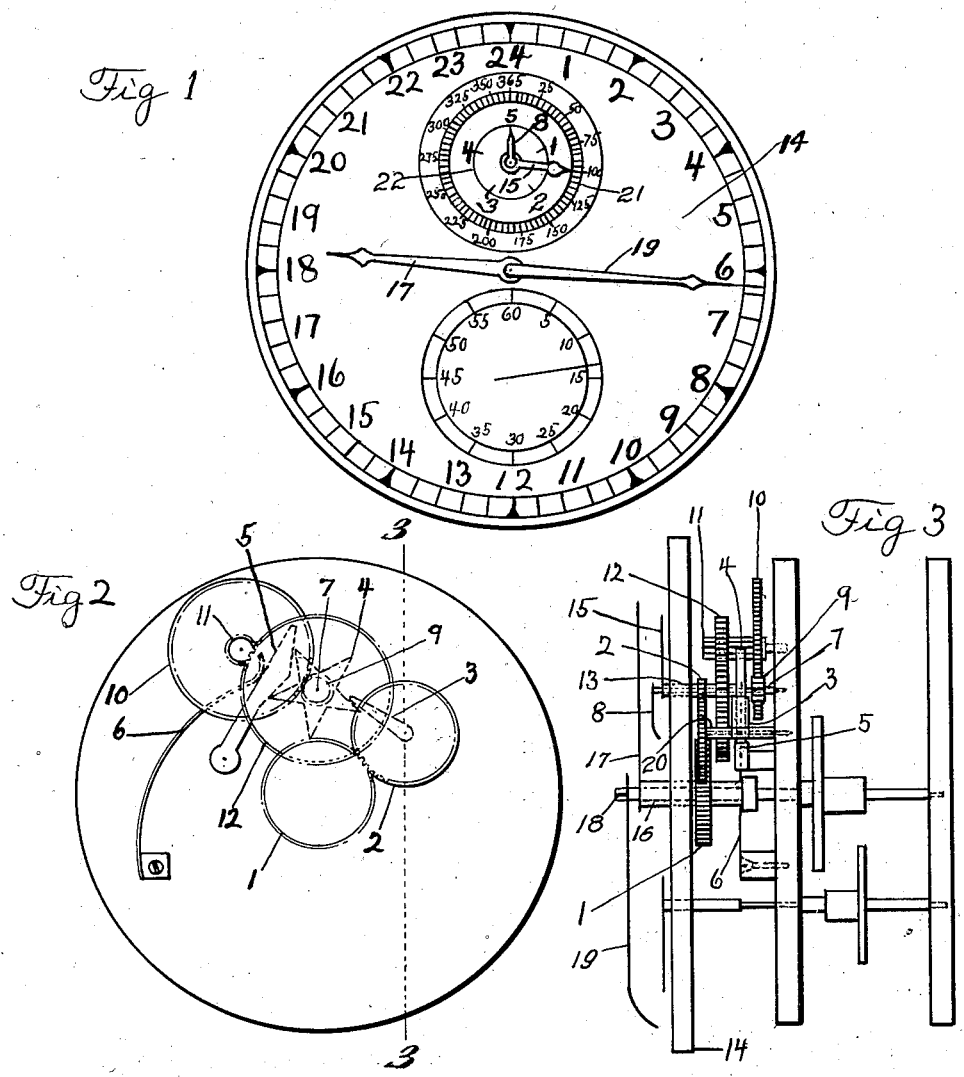
Inventor
Ingild Povelsen
By Harold Dodd
Attorney Patented June 23, 1936

2,044,808

UNITED STATES PATENT OFFICE 2,044,808

MECHANICAL CALENDAR

Ingild Povelsen, Washington, D. C.

Application March 8, 1934, Serial No. 714,653

8 Claims. (Cl. 58—5)

(Granted under the act of March 3, 1883, as amended April 30, 1928; 370 O. G. 757)

This invention relates to a calendar mechanism, adapted to be combined with a timepiece, which registers the days continuously throughout the whole year.

It is the object of this invention to provide a calendar mechanism, applicable to ships' chronometers, that will indicate the 365 days of the year in numerical order and thereby correspond with the daily record sheet as it is kept in the chronometer record book of the navigator.

In the drawing:

Fig. 1 is a view of the face of a chronometer with my invention applied thereto;

Fig. 2 is a diagrammatic view showing the relative positions of the parts involved in the present invention;

Fig. 3 is a sectional view taken substantially on the line 3—3, Fig. 2.

It is to be understood that the usual mechanism of the chronometer is connected to operate the calendar but inasmuch as the former constitutes no part of this invention it has not been shown in the drawing.

The gear 1 is fixed on a sleeve 16 that carries the hour-hand 17 of the chronometer, the said sleeve being coaxial with spindle 18 upon which is mounted the minute-hand 19. Meshed with gear 1 is the gear 2 having the same number of teeth as gear 1, whereby the gear 2 is caused to make one revolution in the same time as does the hour-hand 17. In the instance shown, the chronometer face is calibrated to represent 24 hours. However, it is obvious that if the chronometer dial shows 12 hours, the gear 2 could be made with twice the number of teeth in gear 1 and it would still make but one revolution in 24 hours and would cause gear 1 to make two revolutions in this time. The gear 2 is fixed upon a spindle 20, to which is also secured a laterally extending arm 3. Upon spindle 7 is secured a star-wheel 4 having five points, the star-wheel being so positioned that at each revolution of the arm 3 a point of the star-wheel is contacted by the arm, and the star-wheel is rotated through one-fifth of a revolution. A hand 8 and a pinion 9 are also secured upon the spindle 7. A gear 10 is meshed with the pinion 9 and has secured to it a pinion 11 concentric therewith, the pinions 9 and 11 having the same number of teeth and the pinion 10 having a number of teeth that is the square of the number in pinion 9. A gear 12, meshed with pinion 11, is mounted upon a sleeve 13 that is coaxial with spindle 7 and has secured to it a hand 15. Casual rotation of star-wheel 4 is prevented by a click 5 held in engagement therewith by spring 6.

Upon the dial 14 of the chronometer is a scale 21 calibrated to represent 365 days, each calibration space thereof representing 5 days. Within the scale 21 is a second scale 22 calibrated to represent 5 days with each calibration representing 1 day. It is apparent that the scale 21 cannot conveniently be made large enough to read in units of one day and, therefore, the second scale 22 is provided to make possible the reading of single days, the hand 15 moving over scale 21, and the hand 8 moving over scale 22.

From the foregoing description it is apparent that once every 24 hours the star-wheel 4 will be moved through the space of one point which will likewise rotate the hand 8 through ⅕ of a revolution or over one calibration space on scale 22, the mechanism being so connected that this movement takes place at zero hour. It is likewise apparent that, since the pinion 9 and pinion 11 have the same number of teeth and also since the gear 10 has a number of teeth equal to the square of the number in one of the pinions, the gear 12, which has 73 teeth, will be moved one tooth for each complete revolution of the hand 8 and, therefore, the hand 15 will be caused to make one revolution in five times 73 or 365 days. To take into account the extra day of leap year, the calendar hands should be set back one day on the last day of the year.

The numerical designation of any day in the year is obtained by adding the indication of the hand 8 on scale 22 to the number indicated by the last calibration mark on scale 21 passed over by hand 15.

The invention described herein may be manufactured and used by or for the Government of the United States of America for governmental purposes without the payment of any royalties thereon or therefor.

I claim:

1. The combination with a timepiece having a dial representing 24 hours, an hour-hand movable thereover and a rotatable element to which said hand is fixed; of a first circular scale on said dial representing 365 units calibrated at five-unit intervals, a second circular scale calibrated into five units concentric with the first scale, a first gear wheel fixed on said element, a first rotatable spindle, a second gear wheel having the same number of teeth as the first gear and meshed therewith fixed on said spindle, a laterally extending arm secured on said spindle, a second rotatable spindle concentric with said circular scales, a hand secured to said second spindle to indicate positions on said second scale, a star wheel on said second spindle having five teeth engageable by said arm to be moved one tooth space per revolution of said arm, means to prevent casual rotation of said star wheel, a first pinion on said second spindle, a third gear meshed with said pinion and having a number of teeth equal to the square of the number thereof in said pinion, a second pinion having the same number of teeth as said first pinion and being fixed to said third gear concentric therewith, a rotatable sleeve coaxial with said second spindle, a fourth gear having 73 teeth fixed on said sleeve and in mesh with said second pinion and a hand to indicate positions on the first scale mounted on said sleeve.

2. The combination with a timepiece having a dial, a hand movable thereover and a rotatable element to which said hand is fixed; of a first circular scale on said dial representing 365 units calibrated at five-unit intervals, a second circular scale calibrated into five units concentric with the first scale, a first rotatable spindle, gears connecting said element and said spindle to cause the latter to make one revolution in 24 hours, a laterally extending arm fixed on said spindle, a second rotatable spindle concentric with said annular scales, a hand secured to said second spindle to indicate positions on said second scale, a star wheel on said second spindle having five teeth engageable by said arm to be moved one tooth space per revolution of said arm, a first pinion on said second spindle, means to prevent casual rotation of said star wheel, a first gear meshed with said pinion having a number of teeth equal to the square of the number thereof in said pinion, a second pinion having the same number of teeth as said first pinion and being fixed to said first gear concentric therewith, a rotatable sleeve coaxial with said second spindle, a second gear having 73 teeth fixed on said sleeve and in mesh with said second pinion and a hand to indicate positions on the first scale mounted on said sleeve.

3. The combination with a timepiece having a dial, a hand movable thereover and a rotatable element to which said hand is fixed; of a first circular scale on said dial representing 365 units calibrated at five-unit intervals, a second circular scale calibrated into five units, a first rotatable spindle, gears connecting said element and said spindle to cause the latter to make one revolution in 24 hours, a laterally extending arm fixed on said spindle, a second rotatable spindle concentric with said second scale, a hand secured to said spindle to indicate positions on said second scale, a star wheel on said second spindle having five teeth engageable by said arm to be moved one tooth space per revolution of said arm, a first pinion on said second spindle, means to prevent casual rotation of said star wheel, a first gear meshed with said pinion and having a number of teeth equal to the square of the number thereof in said pinion, a second pinion having the same number of teeth as said first pinion and being fixed to said first gear concentric therewith, a rotatable sleeve concentric with said first scale, a second gear having 73 teeth fixed on said sleeve and in mesh with said second pinion and a hand to indicate positions on said first scale mounted on said sleeve.

4. The combination with a timepiece having a dial, a hand movable thereover and a rotatable element to which said hand is fixed; of a first circular scale on said dial whereof each calibration space represents a number that is a factor of the total number represented by said scale, a second circular scale on said dial calibrated in units whereof the total number is equal to the number represented by one calibration space on the first scale, a first rotatable spindle, gears connecting said element and said spindle to cause the latter to make one revolution in a predetermined interval corresponding to a unit of calibration on said second scale, a laterally extending arm fixed on said spindle, a second rotatable spindle concentric with said second scale, a hand secured to said spindle to indicate positions on said second scale, a star wheel on said second spindle having the same number of points as the units represented by said second scale, said points being engageable by said arm to be moved through one tooth space per revolution of said arm, means to prevent casual rotation of said star wheel, a first pinion on said second spindle, a first gear meshed with said pinion and having a number of teeth equal to the square of the number thereof in said pinion, a second pinion having the same number of teeth as said first pinion and being fixed to said first gear concentric therewith, a rotatable sleeve concentric with the first scale, a second gear having a number of teeth equal to the quotient of the number of units represented by the first scale divided by the number of units represented by the second scale and being fixed on said sleeve and in mesh with the second pinion and a hand to indicate positions on said first scale mounted on said sleeve.

5. The combination with a timepiece having a dial, an hour-hand movable thereover and a rotatable element to which said hand is fixed; of a first circular scale on said dial representing 365 days whereon each calibration space represents a plurality of days, a second scale calibrated in single days whereof the total number is equal to the number represented by one calibration space on said first scale, a hand rotatably mounted to be movable over said first scale, another hand rotatably mounted to be movable over said second scale, and means connected to said element to cause said hands to rotate, said means including gears having such ratios that the first mentioned hand is caused to make a complete revolution in 365 days and to move over one calibration space each time said other hand makes a complete revolution and a device to cause said other hand to move from one calibration to another at the same predetermined time each day and to make a complete revolution in the number of days represented by one calibration space on said first scale.

6. The combination with a timepiece having a dial, an hour-hand movable thereover and a rotatable element to which said hand is fixed; of a first circular scale on said dial representing 365 days whereon each calibration space represents a plurality of days, a second scale calibrated in single days whereof the total number is equal to the number represented by one calibration space on said first scale, a hand rotatably mounted to be movable over said first scale, another hand rotatably mounted to be movable over said second scale, and means connected to said element to cause said hands to rotate, said means including gears respectively connected with said first-mentioned hand and with said other hand, and a gear element normally maintaining said rotatable element free from connection with the gear connected with said other hand but adapted to engage the latter at the same predetermined time each day to move said other hand from one calibration to another, said gears and gear element having such ratios that said first-mentioned hand is caused to make a complete revolution in 365 days and to move over one calibration space each time said other hand makes a complete revolution and to cause said other hand to move from one calibration to another at the same predetermined time each day and to make a complete revolution in the number of days represented by one calibration space on said first scale.

7. In a mechanical calendar, a dial having thereon a circular scale representing 365 days whereon each calibration space represents a plurality of days, a second scale calibrated in single days whereof the total number is equal to the number of days represented by one calibration space on said first scale, a hand rotatably mounted to be movable over said first scale, a hand rotatably mounted to be moved over said second scale, means including a rotatable element for effecting a complete revolution of said first-mentioned hand in 365 days, means including a star wheel having a number of points equal to the number of days represented on said second scale, and a member coacting with said star wheel and connected with said rotatable element to rotate said second-mentioned hand only at a predetermined time each day and to effect a complete revolution of said second-mentioned hand in the number of days represented by a calibration space on said first-mentioned scale.

8. In a mechanical calendar, a dial having thereon a circular scale representing 365 days whereon each calibration space represents a plurality of days, a second scale calibrated in single days whereof the total number is equal to the number of days represented by one calibration space on said first scale, a hand rotatably mounted to be movable over said first scale, another hand rotatably mounted to be movable over said second scale, a rotatable element, gear mechanism between said rotatable element and said hands, said gear mechanism including a gear element and a star wheel intermittently engageable thereby for maintaining said other hand normally free from said rotatable element but movable thereby at predetermined intervals, said gear mechanism having such ratios that said first-mentioned hand is caused to make a complete revolution in 365 days and to move over one calibration space each time said other hand makes a complete revolution and to cause said other hand to move from one calibration to another at the same predetermined time each day and to make a complete revolution in the number of days represented by one calibration space on said first scale.

INGILD POVELSEN.